April 18, 1950      J. A. HILLS      2,504,837
WELDING ROD HOLDER
Filed Sept. 15, 1947
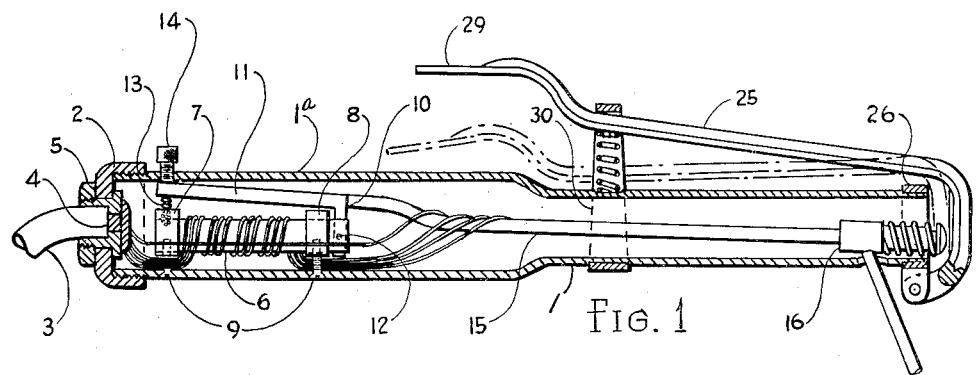
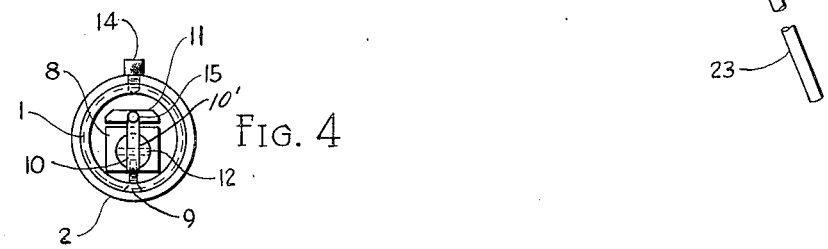
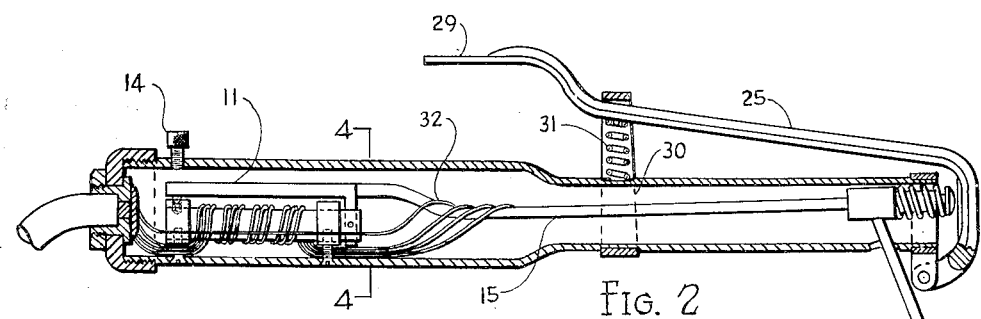
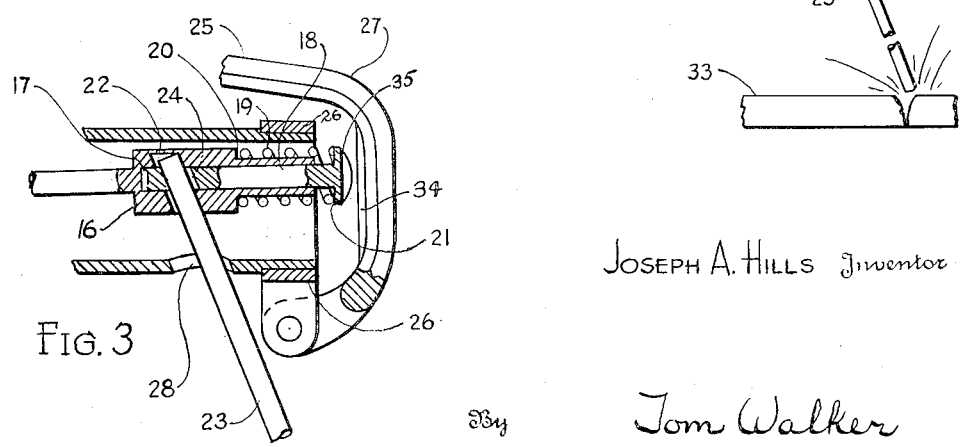
JOSEPH A. HILLS Inventor
By Tom Walker
Attorney Patented Apr. 18, 1950

2,504,837

UNITED STATES PATENT OFFICE 2,504,837

WELDING ROD HOLDER

Joseph A. Hills, Dayton, Ohio

Application September 15, 1947, Serial No. 774,063

10 Claims. (Cl. 219—8)

This invention relates to electric welding apparatus and more particularly to an electrode holder which will automatically retract the electrode to strike an arc when brought into contact with the work piece to be welded.

The most difficult portion of welding technique is in the striking of the welding arc. An experienced operator learns to properly strike such an arc only through experience, which the beginner or novice does not possess. The present electrode holder is primarily intended for use by inexperienced persons to assist them in the striking of the welding arc.

In electric welding the operator applies the electrode forming the terminal of one side of an electric welding circuit to the work to be welded connected to the opposite side of the welding circuit. However, it is necessay that the operator slightly withdraw the electrode from the work after establishing the circuit to form an intervening gap and induce an arc thereacross. The arc is formed by an incandescent conductive vapor formed by volatilization of the material of the electrode and the work piece, which bridges the intervening gap and across which the current continues to flow until increased width of the gap introduces resistance beyond the conducting power of the vapor stream. If the operator does not retract the electrode sufficiently quickly after establishing the circuit, it is likely to fuse fast and become rigidly attached to the work. Many operators encounter such difficulties, especially those who may lack long welding experience.

The instant holder has, however, been found quite acceptable and is in demand by experienced welders, since it greatly simplifies the operation and is much quicker to use.

There have been numerous automatic electrode holders heretofore proposed, most of such holders being used in connection with automatic or motor operated welding machines. There have been a few manual electrode holders of the automatic type, but such holders have all been relatively complicated and expensive to produce. Maintenance expense has also been high due to the complicated construction employed.

Thus, the object of the present invention is to improve the construction as well as the means and mode of operation of automatic arc drawing electrode holders, whereby they may not only be economically manufactured, but will be more efficient in use, convenient in operation, uniform in action, embodying minimum parts and be unlikely to get out of repair.

A further object of the invention is to provide an electrode holder intended for manual use, which will automatically draw the welding arc when the electrode is placed in contact with the work piece to be welded, independently of the reaction of the operator.

A further and important object of the invention is to provide automatic means for instantly retracting the welding rod electrode upon initial completion of the welding circuit by contact of the electrode to the work piece, thereby automatically inducing formation of an arc of predetermined extent.

A further object of the invention is to provide adjustable stop means for automatically limiting the length of the induced arc to predetermined extent.

A further object of the invention is to provide an electrode holder having therein an oscillatory electrode carrier actuated by completion of the welding circuit.

A further object of the invention is to provide an electrode holder of the character described in which the electrode may be easily inserted within the carrier and securely grasped thereby.

A further object of the invention is to provide in an electrode holder of the present type an easily accessible control member for releasing the electrode from its carrier.

A further object of the invention is to provide an assembly of the character described, possessing the advantageous structural features, the inherent meritorious characteristics, and the mode of operation herein described, or their equivalents.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

In the accompanying drawing, wherein is illustrated the preferred but obviously not the only embodiment of the invention:

Fig. 1 is a longitudinal section of a welding rod holder embodying the present invention.

Fig. 2 is a longitudinal section of the holder, with the electrode carrier in operated position after striking the arc.

Fig. 3 is a fragmentary view showing the electrode gripping means in release position, and Fig. 4 is a fragmentary sectional view on line 4—4 of Fig. 2.

Like parts are indicated by similar characters of reference throughout the several views.

Referring to the drawings, there is shown in Fig. 1 an electrode holder embodying the present invention, in which 1 represents a tubular holder of fiber or other insulating material, here shown in longitudinal section. Secured to the rear of the holder 1 is a collar 2 through which projects an electrical cable 3 connected with a generator or other type of electric welder equipment. A shouldered insert 4 is secured to the cable, and clamped within the collar 2 by the jamb nut 5 engageable with the insert to create a clamping pressure upon the collar 2.

Mounted within the handle portion 1a of the holder is an electromagnet, comprising a core member 6 supported adjacent its opposite ends by mounting brackets 7 and 8. The brackets 7—8 are secured to the handle portion 1a by the screws 9 which are countersunk relative to the outer periphery of the handle.

The core 6, which is preferably but not necessarily of laminated construction, projects beyond the bracket 8 a short distance, such extension serving as a support for a rotatable armature. The armature is substantially L-shaped, having a downwardly projecting arm 10 and a longitudinally disposed clapper 11. The arm 10 is received within a vertical slot 10' in the projecting portion of the core 6, and is pivotally secured therein by a pivot pin 12. The arm 10 of the armature is secured to the core 6 in axially spaced relation with the mounting bracket 8 to permit limited oscillatory motion of the arm about the pivot pin without contacting the adjacent bracket.

The clapper portion 11 when in operated position overlies the brackets 7—8 in slightly spaced relation therewith, the brackets duofunctionally serving as pole pieces for the magnet. Sticking of the armature due to residual magnetism is thereby eliminated.

To further insure against a "sticking" armature, a small spring 13 is seated in the rear pole piece 7 to resiliently urge the armature upwardly or away from the pole piece. When the magnet is energized, the spring 13 is compressed by downward movement of the armature. Upon deenergization of the magnet, the spring is free to expand, thereby swinging the armature to open position.

The amount of oscillatory motion of the armature about its pivot 12 is regulated by an adjustment screw 14 adjustably secured in the top of the handle portion of the holder 1. The screw 14 acts as a stop to limit the upward movement of the armature, and by adjusting the screw relative to the holder the length of arc drawn by the holder may be easily adjusted. The armature is normally urged upward against the stop by the spring 13 and the weight of the electrode and carrying arm which projects forwardly from the pivot 12.

Secured to the armature for unison oscillatory movement therewith is an electrode carrying arm 15, upon the end of which is mounted an electrode clamp within which the electrode is releasably gripped. An enlarged head 16 on the end of the carrying arm 15 is counterbored to provide a socket 17. Within the socket 17 is a plunger 18 which may be urged inwardly within the socket under the yielding influence of a spring 19 surrounding the head 16 and seated on the shoulder 20 thereof. The opposite end of the spring bears upon the under side of an enlarged head 21 on the plunger 18.

The head 16 has a transverse bore 22 therein inclined relative to the axis of the head, within which bore the end of a welding rod or electrode 23 is received. The plunger 18 also has a transverse bore 24 therein, the angle of which is the same as the bore 22. When the plunger is moved inwardly relative to the head, the bores 22 and 24 are brought into alignment and the welding rod may be passed therethrough. Upon release of the plunger 18 the bore 24 therein is displaced relative to the bore 22 in the head, and the welding rod is clamped therebetween.

Operation of the welding rod clamp is accomplished by a substantially J-shaped lever 25 pivotally secured upon the holder 1 by a band 26. The vertical portion 27 of the lever bears upon the head 21 of the plunger 18 and upon oscillation of the lever in a counter-clockwise direction, the plunger 18 is pressed inwardly against the resistance of the spring 19. The welding rod is thereby released for removal therefrom preparatory to the insertion of a new rod. The holder 1 has an opening 28 in the bottom thereof through which the rod projects. This opening is of sufficient size to permit oscillation of the rod about the pivot 12 upon movement of the armature relative to the magnet.

The upper portion 29 of the lever 25 extends rearwardly in substantially parallel relation with the holder 1, and provides a handle portion which is within easy grasp of an operator's hand. A band 30 surrounds the holder 1, and encloses the lever arm 29, limiting its movement in a clockwise direction. Interposed between the holder 1 and the lever arm 29 is a spring 31, which urges the lever arm 29 to its limit of oscillation in a clockwise direction, and which is compressed upon movement of the arm in a counter-clockwise direction to release the welding rod.

The greater portion of the electrical cable 3 is wound about the magnet core 6 before being secured to the electrode carrying arm 15. The magnet is therefore in series with the electrode 23. A shunt circuit 32 is provided, however, through which a portion of the electrical energy is carried directly to the electrode carrying arm 15 and the electrode 23. By such construction the potential supplied to the magnet is reduced somewhat, thereby permitting the use of a smaller magnet than would otherwise be necessary.

The work piece 33 to be welded is connected to the welding unit and forms the electrode of the other side of the circuit. The circuit is completed by bringing the welding rod 23 into contact with the work piece 33, thereby energizing the magnet by a flow of a portion of the welding current therethrough.

The holder 1 is grasped in the operator's hand and the rod 23 is touched to the work piece 33, causing current to flow through the conductor 3. The magnet is immediately energized by the portion of the current flowing through the major portion of conductor 3 wound about magnet core 6. Energization of the magnet attracts the armature 11, moving it in a counter-clockwise direction from the position of Fig. 1 to that shown in Fig. 2. Such movement of the armature 11 causes the electrode carrying arm 15 to move upward about the pivot 12, thereby raising the electrode or welding rod 23 from the work piece 33. Such movement of the rod 23 strikes the desired arc without manual movement of the holder away from the work piece. The human element in the process of striking the welding arc is thereby completely eliminated.

The length of arc is easily adjusted by the screw 14 which determines the extent of travel movement of the armature 11 and electrode carrying arm 15. By adjusting the armature 11 downwardly toward the magnet when the unit is in its normal or de-energized condition, the distance through which the armature travels when attracted by energization of the magnet is reduced. This reduces the extent of upward movement of the carrying arm 15, thereby reducing the length of the arc. Conversely, the length of arc may be increased by increasing the extent of travel movement of the armature 11.

Rotation of the plunger 18 within the head portion 16 of the rod clamp when a welding rod is not clamped therein is prevented by interlocking engagement of the vertical portion 27 of the control lever 25 with the head 21 on the plunger. A projecting rib 34 on the vertical portion of the lever engages within a slot 35 diametrically disposed upon the outer face of the head 21. Upon movement of the lever portion 27 into contact with the head 21 to compress the spring 19, the head is locked against rotational movement by engagement of the rib 34 within the slot 35, which engagement is maintained under influence of the spring 19. Should the lever 25 be released without insertion of a new welding rod, the interlocking engagement of the rib 34 and slot 35 is continued under influence of the spring 19 throughout the full range of outward movement of the plunger 18. The axes of the bores 22 and 24 are therefore constantly restrained against relative rotational adjustment permitting immediate alignment thereof when the plunger 18 is depressed or moved inwardly by counter-clockwise rotation of the lever 25. Upon insertion of an electrode within the aligned bores 22—24, the plunger 18 is restrained in its outward movement under influence of the spring 19 to such extent that the lever portion 27 moves outwardly relative to the head 21 to withdraw the rib 34 from the slot 35, permitting free, unrestricted oscillatory motion of the electrode carrying arm 15 under influence of the magnet.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention in effect, and the invention is therefore claimed in any of its forms or modifications within the legitimate and valid scope of the appended claims.

Having thus described my invention, I claim:

1. A hand welding tool of the type wherein a welding electrode is automatically retracted relative to the work piece to induce a welding arc therebetween, characterized by a holder to be grasped by the operator's hand, an electromagnet having a magnetic core projecting from one end thereof supported by the holder, an L-shaped armature for said magnet pivotally mounted upon the core extension for rocking motion relative thereto, means for minimizing sticking of the armature under influence of residual magnetism, including a compression spring interposed between the armature and the magnet normally urging the armature toward open position and against the resilient resistance of which the armature is moved to closed position under influence of the electromagnet, an electrode carrying arm secured to the armature for rocking motion therewith, an electrode clamp carried by the arm within which a welding electrode is detachably engageable, and means for energizing the magnet including an electrical welding circuit of which the electrode is a part, at least a portion of the current in said circuit being utilized to energize the magnet upon closing of the circuit by contact of the electrode with the work piece, the construction and arrangement being such that the armature and electrode carrying arm are rocked about their pivot upon energization of the magnet to automatically withdraw the electrode from the work piece a predetermined distance inducing a welding arc of predetermined extent therebetween.

2. A hand welding tool adapted to automatically strike a welding arc, wherein an electrode is automatically retracted relative to a work piece to induce an arc therebetween, including a hand piece, an electromagnet carried thereby including a core, an armature connected to the core for rocking motion relative thereto upon energization of the magnet, an electrode carrying arm connected to the armature for rocking motion therewith to raise the arm and electrode carried thereby simultaneously with the retraction of the armature by the magnet core, and an electrical conductor leading from a grounded source of electrical energy, a portion thereof defining the multiple turns about the magnet core, forming the energizing winding therefor, the construction and arrangement being such that merely touching the electrode to a grounded work piece will complete an electrical circuit through the conductor to supply welding current to the electrode and work, and simultaneously energize the magnet to retract the armature relative to the magnet to simultaneously lift the arm relative to the holder and retract the electrode away from the work to thereby induce a welding arc therebetween.

3. A hand welding tool adapted to automatically strike a welding arc, wherein the welding electrode is automatically retractable relative to a work piece, including a hand piece, an electromagnet carried thereby, a pivoted armature rocked by energization of the electromagnet, an electrode associated with the armature, an electrical conductor leading from a source of electrical energy through multiple turns comprising the energizing winding of the electromagnet and thence to the electrode, the construction and arrangement being such that upon closing the electric welding circuit through said conductor the electromagnet is energized to retract the armature and thereby withdraw the electrode away from the work piece and srike an intermediate welding arc therebetween.

4. An electrical hand welding appliance for automatically striking a welding arc, including a movable welding rod holder, a rockable actuator therefor, electrically responsive means for energizing said actuator to withdraw the welding rod holder away from the work to strike an arc between the welding rod and the work, and an electric energizing circuit therefor closed by contact of the rod with the work.

5. An electrical welding appliance wherein a welding current produces a welding arc between a welding rod and work to be welded, characterized by the combination therewith of pivotally movable actuator for moving the welding rod relative to the work, said actuator being electrically energized by contact of the welding rod with the work to automatically retract the rod a limited distance therefrom to induce therebetween a welding arc.

6. An electrical welding appliance wherein electric current is supplied to a welding rod, characterized by pivotally movable actuator for moving the welding rod relative to the work, an operator for said actuator energized by contact of the welding rod with the work, whereupon said actuator is effective to retract the rod a limited distance away from the work to induce a welding arc therebetween.

7. An electrically operated hand welding appliance wherein a welding electrode is automatically retracted relative to a work piece, including an electromagnet, an elongated armature pivoted thereon for rocking movement toward and from said magnet, reciprocatory gripping means for holding an electrode carried by the armature at one end thereof, a hand operated actuator for the gripping means intermittently engageable therewith, and locating means maintaining the reciprocatory gripping means and the actuator in fixed relation one relative to the other in a rotary sense but permitting relative lateral motion therebetween in response to rocking movement of said armature.

8. An electrically operated hand welding appliance wherein a welding electrode is automatically retracted relative to a work piece, including an electromagnet, an elongated electrode carrier pivotally mounted upon the magnet with one end thereof extending in overlying relation with the magnet, the electrode being supported by the opposite end thereof, and an electrical conductor interconnecting the electrode through the magnet with a source of electrical energy, the construction and arrangement being such that upon closing of the electrical circuit the electrode carrier is attracted by the magnet thereby rocking the carrier about its pivot to retract the electrode relative to the work piece.

9. A hand welding device of the character described comprising an elongated hand piece, an electromagnet affixed thereto and in serial relationship with a source of welding current, said electromagnet having a core and a pivotally mounted armature, an electrode carrying arm extending from said armature and movable therewith, whereby flow of welding current will cause the armature and its arm to pivot to establish a preferred arc length between the work and an electrode carried by the arm.

10. A hand welding device of the character described comprising an elongated hand piece, an electromagnet affixed thereto and in serial relationship with a source of welding current, said electromagnet having a core and a pivotally mounted armature, an electrode carrying arm associated with said armature and movable therewith, whereby flow of welding current will cause the armature and its arm to pivot to establish a preferred arc length between the work and an electrode carried by the arm.

JOSEPH A. HILLS.

REFERENCES CITED

The following references are of record in the file of this patent:

UNITED STATES PATENTS

| Number | Name | Date |
|---|---|---|
| Re. 15,652 | Woltmann | July 10, 1923 |
| 1,425,440 | Beiswinger et al. | Aug. 8, 1922 |
| 1,928,517 | Varner | Sept. 26, 1933 |
| 2,191,494 | Nelson | Feb. 27, 1940 |
| 2,265,169 | Hughes et al. | Dec. 9, 1941 |
| 2,399,771 | Tyrner | May 7, 1946 |
| 2,406,365 | Gough | Aug. 27, 1946 |